United States Patent Office 3,445,391
Patented May 20, 1969

3,445,391
ORGANIC COMPOSITIONS CONTAINING AMINOQUINONES
Milton Braid, Barrington, and Derek A. Law, Pitman, N.J., assignors to Mobil Oil Corporation, a corporation of New York
No Drawing. Filed Oct. 31, 1966, Ser. No. 590,482
Int. Cl. C10m 1/32; C08f 45/60
U.S. Cl. 252—51.5         22 Claims

ABSTRACT OF THE DISCLOSURE

Lubricating oils containing aminobenzoquinones or aminonaphthoquinones to improve oxidation stability.

This invention relates to additives for organic compositions and particularly to lubricating oil compositions having improved oxidation stability.

Many industrial organic media are used under circumstances which contribute to their breakdown during service. Such media include lubricants and greases, hydraulic fluids for brake and transmission systems, resins and plastics for coatings and structural articles. The severe operating conditions of modern engines, for example, including automotive and gas turbine engines, have often caused lubricating oils to deteriorate rapidly during use. This oxidation deterioration is accelerated by the use of higher engine operating temperatures than formerly used. Oxidative deterioration of the oil is usually accompanied by the formation of gummy deposits, sludge, acids, which may be strong enough to cause metal corrosion and other products of chemical breakdown. These products may seriously interfere with the lubrication operation. The increase in viscosity which results from the oxidation of lubricants impairs the proper function of engine components and depreciates engine performance and useful life.

Organic media are generally blended with additives, termed "antitoxidants" which protect against oxidation. Although many of the older known additives have been found to be adequate in stabilizing some modern mineral oil lubricants and synthetic lubricant blends discovery of new and more effective additives would be highly desirable for improved protection in current engines and extension of operating limits for future engines.

It is a major object of this invention to provide novel organic compositions which have improved oxidation stability. It is a further object of this invention to provide novel compositions which afford protection against oxidation deterioration for organic media to which they have been added. Another object is to provide improved lubricating oil compositions capable of withstanding the oxidizing conditions of modern engines. These and other objects will become apparent from the following disclosure.

It has now been discovered that organic compositions ordinarily susceptible to deterioration caused by oxidation may have improved stability by the addition thereto of a minor amount of a quinone having at least one amino group attached thereto. Suitable quinones include amino-substituted benzoquinones, naphthoquinones, and organo-substituted derivatives thereof.

The aminoquinones of this invention have the general structure

[Q]—(NR′R)$_n$ wherein Q is benzoquinone, naphthoquinone or substituted derivatives thereof and R and R′ may each be hydrogen, hydrocarbyl or substituted hydrocarbyl. At least one of R and R′ is always a hydrocarbyl or substituted hydrocarbyl group. The term "hydrocarbyl" for the purpose of this invention, includes such organic groups as alkyl, alkenyl, cycloalkyl, aralkyl and substituted derivatives thereof, including groups containing oxygen, sulfur, nitrogen and halogen atoms, such as alkylaminoalkyl, hydroxyalkyl, alkoxyalkyl, acyloxy and haloalkyl; or aryl, alkaryl and substituted derivatives thereof containing oxygen, sulfur, nitrogen and halogen groups; and $n$ is 1 to 2. Each R or R′ group may be the same as another or several other R or R′ groups, or different therefrom. Also, the two groups attached to each nitrogen atom may be bonded in a cyclic structure to produce heterocyclic amino groups attached to the nucleus of the quinone. Thus R and R′ groups may be part of aziridyl, azetidyl, pyrrolidyl, tetrahydroquinolyl, and piperidyl radicals. The number of aliphatic carbon atoms for the organo groups, either individually or as representing a heterocyclic radical, may range from 1 to about 40 carbon atoms, and preferably from 4 to 20 carbon atoms per group.

The aminoquinones of this invention preferably have the following specific structures

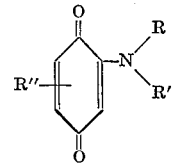

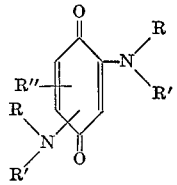

and

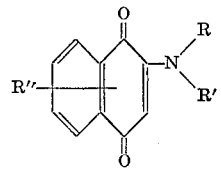

wherein the R and R′ groups have the above mentioned definitions, and R″ has the same definition as R and R′, or may also be halogen, hydroxy, alkoxy, acyloxy, acylamido, carbalkoxy or substituted derivatives of these. The preferred substituents are those organo or substituted organo groups, and especially alkyl or substituted alkyl, having from 1 to about 40 carbon atoms.

Although the alkyl groups on each nitrogen atom may be different, symmetrical alkyl amines are employed herein to illustrate the essential features of this invention.

The aminoquinones used in this invention may be prepared by the reaction between a quinone and a primary or secondary amine; or by the reaction between the amine reactant and a hydroquinone. In the latter reaction, the reactants are dissolved in a suitable solvent and a stream of air or oxygen or other oxygen-containing gas is dispersed therethrough with agitation at or above room temperature. Alternatively, the oxidation step may be performed with an oxidizing agent, such as hydrogen peroxide, potassium permanganate, manganese dioxide, sodium chlorate and the like. The mole ratio of the reactants may be varied to produce the desired product. Approximately a 0.5:1 to 1:1 ratio of amine to quinone may usually be used to produce monoaminobenzoquinones and naphthoquinones; a 2:1 to 10:1 ratio for the diaminobenzoquinone. It is preferred to have an excess of amine present in the reaction mixture.

As indicated above, the amine reactant may be a simple alkyl, cycloalkyl, or aralkyl amine, having from 1 to about 40 carbon atoms. Representative of these amines are ethylamine, butylamine, t-butylamine, t-octylamine, t-eicosylamine, n-hexylamine, n-octylamine, n-dodecylamine, n-octadecylamine, cyclohexylamine, benzylamine and the like. The substituted hydrocarbyl amines include hydroxyethylamine, 1,1-dimethyl-2-hydroxyethylamine, 1,1-dihydroxy-methylethylamine, ethylenediamine, diethylaminoethylamine, and diethylaminopropylamine. Secondary and heterocyclic amines contemplated in this invention include dibutylamine, dihexylamine, di-2-ethylhexylamine, piperidine and the like. If desired, two different amine reactants may be employed.

Monoaminoquinones found suitable in this invention include 2-propylamino-p-benzoquinone, 2-dibutlyamino-p-benzoquinone, 2-t-butylaminonaphthoquinone, 2-amylamino-p-benzoquinone, 2-(1,1,3,3-tetramethyl)butylaminonaphthoquinone, and other N-alkyl and di-N-alkyl derivatives. Also included are further substituted monoaminoquinones, such as 2-(2-diethylaminoethylamino)-p-benzoquinone, 2-(3-diethylaminopropylamino)naphthoquinone, and 2-(1,1-dimethyl-2-hydroxyethylamino)naphthoquinone; and those having nucleus-substituted groups, such as 2-t-butyl-5-butylamino-p-benzoquinone and 2-t-butyl-5-benzoylamino-p-benzoquinone.

The bisaminoquinones produced in accordance with this invention include 2,5- and 3,5-bisamino-p-benzoquinones, such as 2,5-bis-butylamino-p-benzoquinone, 2,5-bis-n-hexylamino-p-benzoquinone, 2,5-bis-(1,1,3,3-tetramethylbutylamino)-p-benzoquinone, 2,5-bis-t-octylamino-p-benzoquinone, 2,5-bis-t-nonylamino-p-benzoquinone, 2,5-bis-n-dodecylamino-p-benzoquinone, 2,5-bis-piperidinyl-p-benzoquinone and 2,5-bis-cyclohexylamino-p-benzoquinone.

Aminoquinones with functional group substituents may be further reacted to improve solubility or antioxidant effectiveness or compatibility with other components of lubricant formulations. Representative of these further reactions are alkylation or acylation of amino or hydroxy substituent groups. Such products as 2,5-bis-(1,1-dimethyl-2-ethoxyethylamino)-p-benzoquinone, 2,5 - bis - (1,1-dimethyl-2-caproxyethylamino)-p-benzoquinone, 2,5-bis-(1,1-dicaproxymethylethylamino)-6-benzoquinone, 2,5-bis-(1,1-dimethyl-2-acetoxyethylamino)-p-benzoquinone, 2,5-bis-(1,1-dimethyl-2-caproyloxyethylamino)-6-benzoquinone, 2,5-bis(1-1-diacetoxymethylethylamino)-p-benzoquinone, and 2,5-bis-(1,1-dicaproyloxymethylethylamino)-p-benzoquinone are representative of the products of such reactions.

We have found that, in accordance with this invention, the presence of these aminoquinones aid in preventing the breakdown of industrial organic substances normally susceptible to oxidation deterioration when subjected to oxidation and other deteriorative forces, particularly at high temperatures. These additives have been found to reduce, in an unexpectedly improved manner, the formation of acids and the viscosity change in lubricating compositions during use. Such media as plastics and rubbers, including polyglycol ethers, polyurethanes, polyvinyl compounds, conjugated diene polymers (as GR—S rubbers), and the like, may be improved by the aminoquinones of this invention. The organic substances of primary interest in this invention are lubricating oil compositions in which the base medium is a hydrocarbon mineral oil or one of the synthetic lubricating fluids, the latter being suitable for use in gas turbine engines, such as jet aircraft engines. Such synthetic fluids include polyolefin fluids, polyalkylene oxide fluids, silicone polymer fluids, polyarylether fluids, polyacetals, and organic ester fluids. This latter class includes polyesters, diesters, such as those prepared from dicarboxylic acids and monohydric alcohols or glycols and monocarboxylic acids, triesters including, for example, esters prepared from dimethylolpropane and monocarboxylic acids, and tetraesters prepared from pentaerythritol and monocarboxylic acids, the acids in these ester fluids having from about 1 to about 30 carbon atoms. Special attention is given in this invention to the tetraester fluids of pentaerythritol and monocarboxylic acids. Solid lubricants capable of being compounded may also be employed as the base media in this invention.

The following illustrative examples are intended to describe the invention more fully and are not deemed a limitation of the scope thereof. All parts and percentages are by weight unless otherwise specified.

EXAMPLE 1

In a suitable reactor, 165 grams (1.5 moles) of hydroquinone was dissolved in 1 liter of methanol, and 230 grams (3.15 moles) of n-butylamine was added at 25° C. as the mixture was stirred. The temperature rose to 40° C. during which a color change was observed. After 5 minutes of stirring, a slow stream of oxygen was passed through the mixture. The temperature rose to 51° C. over a 2-hour period. A red crystalline product, 2,5-bis-n-butylamino-p-benzoquinone, commenced to precipitate. The total oxygen treatment lasted for 16 hours. Afterward, the solid was filtered off and washed in methanol, yielding 237 grams (63%) of product; M.P. 157°–158° C.

*Analysis.*—Calc'd: C, 67.17%; H, 8.86%; N, 11.19%. Found: C, 67.34%; H, 8.48%; N, 11.30%.

EXAMPLE 2

In a suitable reactor were added 108 grams (1 mole) of benzoquinone and 292 grams (4 moles) of t-butylamine in a benzene solution. The mixture was held at a temperature in the range of 45° to 65° C. for three hours. At the end of this time, the mixture was filtered and unreacted amine and solvent were removed. A total of 93 grams (73% yield) of product, 2,5-bis-t-butylamino-p-benzoquinone, was obtained: M.P. 239°–240° C.

*Analysis.*—Calc'd: C, 67.17%; H, 8.86%; N, 11.19%. Found: C, 66.93%; H, 8.90%; N, 11.30%.

EXAMPLE 3

Following the method of Example 1, n-octylamine was reacted with hydroquinone. The oxidation was carried out for a period of 24 hours. A yield of 63% of crude, 2,5-bis-n-octylamino-p-benzoquinone, M.P. 134° C., was obtained.

*Analysis.*—Calc'd: C, 72.87%; H, 10.56%; N. 7.73%. Found: C, 73.08%; H, 10.35%; N, 7.71%.

EXAMPLE 4

Following the method of Example 1, cyclohexylamine was reacted with hydroquinone. The oxidation was carried out for a period of 19 hours. A yield of 34% of crude 2,5-bis-cyclo-hexylamino-p-benzoquinone, M.P. 208° C., was obtained.

*Analysis.*—Calc'd: C, 71.48%; H, 8.67%; N, 9.25%. Found: C, 71.18%; H, 8.04%; N, 9.66%.

EXAMPLES 5 TO 13

Using procedures similar to Example 1, a number of amines were reacted with hydroquinone to produce the corresponding 2,5-diorganiamino-p-benzoquinone. Procedural conditions and results are tabulated in Table 1.

TABLE I

| Ex. No. | Amine Reactant | Oxidation Time, hrs. | Yield, percent | Crude Product Melting Point, °C. | C | | H | | N | |
|---|---|---|---|---|---|---|---|---|---|---|
| | | | | | Found | Calc'd. | Found | Calc'd. | Found | Calc'd |
| 5 | Ethylamine | 65 | 41 | 212 | 60.90 | 61.85 | 6.99 | 7.27 | 14.30 | 14.42 |
| 6 | Allylamine | 64 | 53 | 193 | 64.92 | 66.05 | 6.21 | 6.47 | 12.6 | 12.84 |
| 7 | iso-Butylamine | 64 | 68 | 196 | 67.40 | 67.17 | 8.96 | 8.86 | 11.1 | 11.19 |
| 8 | n-Octadecylamine | 20 | 25 | 85 | 78.46 | 78.04 | 11.80 | 12.23 | 4.42 | 4.35 |
| 9 | 2-hydroxyethylamine | 6 | 70 | 247 | 52.39 | 53.10 | 6.79 | 6.24 | 12.4 | 12.38 |
| 10 | Ethylenediamine | 60 | 74 | Over 250 | 49.55 | 46.88 | 5.63 | 6.29 | 21.8 | 21.87 |
| 11 | Dodecylamine | 24 | 66 | 117–119 | 75.71 | 75.45 | 11.5 | 11.47 | 5.82 | 5.90 |
| 12 | Piperidine | 13 | 88 | 176 | | | | | 9.96 | 10.21 |
| 13 | Mixture of 2-aminoalkanes ranging from C₁₃ to C₁₆ (commercially, "Armen L-11") | ¹ 53 | (²) | | | | | | | |

¹ (24 hrs. air).  ² Grease formed.

Evaluation of products

The quinones of this invention were tested in a catalytic oxidation test for lubricants, using as the base medium a synthetic ester lubricant. This lubricant is prepared by the esterification of technical grade pentaerythritol with a mixture of commercial valeric and pelargonic acids. The test lubricant composition is subjected to a stream of air which is bubbled through the composition at a rate of 5 liters per hour at 425° F. for 24 hours. Present in the composition are metals commonly used as materials of engine construction, namely:

(a) 15.6 sq. in. of sand-blasted iron wire,
(b) 0.78 sq. in. of polished copper wire,
(c) 0.87 sq. in. of polished aluminum wire, and
(d) 0.167 sq. in. of polished lead surface.

Inhibitors for oil are rated on the basis of prevention of oil deterioration as measured by the increase in acid formation or neutralization number (NN) and kinematic viscosity (KV) occasioned by the oxidation. The results of the tests are reported in Table II.

TABLE II

| Additive | Conc., Weight Percent | NN Increase | Percent Increase of KV at 100° F. | Sludge | Lead Loss, mg. |
|---|---|---|---|---|---|
| None | | 5 to 9 | 390 | Trace | 19.2 |
| 2,5-di-t-butyl-p-benzoquinone | 1 | 8.98 | 415 | Nil | 3.5 |
| 2,5-bis-t-butylamino-p-benzoquinone | 1 | 0.79 | 8 | Trace | 6.3 |
| 2,5-bis-n-hexylamino-p-benzoquinone | 1 | 1.0 | 5 | Heavy | 0.9 |
| 2,5-bis-n-octylamino-p-benzoquinone | 1 | 1.7 | 16 | Nil | 7.2 |
| 2,5-bis-n-dodecylamino-p-benzoquinone | 1 | 1.0 | 14 | Trace | 21.7 |
| Product of Example 13 | 0.5 | 4.8 | 128 | Nil | 2.1 |
| 2,5-bis-piperidinyl-p-benzoquinone | 2 | 7.37 | 106 | Heavy | 1.0 |
| 2,5-bis-2-hydroxyethylamino-p-benzoquinone | <0.75 | 4.84 | 404 | Nil | 6.0 |

EXAMPLES 14 to 21

Using procedures similar to Example 2, a number of amines were reacted with benzoquinone to produce the corresponding 2,5 - diorganoamino - p - benzoquinone. Results are tabulated in Table III.

The products of these examples were also tested in the catalytic oxidation test described previously. The same base fluid was used as before. The results are tabulated in Table IV.

TABLE IV

| Additive as Prod. of Ex. No. | Conc., Weight Percent | NN Increase | Percent Increase of KV at 100° F. | Sludge | Lead Loss, mg. |
|---|---|---|---|---|---|
| None | | 5 to 9 | 390 | Trace | 19.2 |
| 14 | 2 | 0.48 | 5 | Heavy | 33.2 |
| 15 | 2 | 0.43 | 8 | Nil | 30 |
| 16 | 0.5 | 3.51 | 98 | Nil | 0.6 |
| 17 | 2 | 6.25 | 134 | Heavy | 0 |
| 18 | <0.25 | 5.88 | 224 | Medium | 0.4 |
| 19 | 1 | 62.7 | 152 | Heavy | 10.0 |

EXAMPLES 22 to 27

Mono-organoaminoquinones have also been prepared following the procedures of Example 2. In this series of examples, however, the mole ratio of amine to quinone was at least 1 to 1. The operating times and temperatures and the reaction solvent were substantially the same. The analyses of the products prepared are tabulated in Table V.

TABLE III

| Ex. No. | Reactant amine | Crude Product Melting Point, ° C. | Percent Carbon | | Percent Hydrogen | | Percent Nitrogen | |
|---|---|---|---|---|---|---|---|---|
| | | | Calc'd. | Found | Calc'd. | Found | Calc'd. | Found |
| 14 | 1,1,3,3-tetramethylbutylamine | 139–140 | 72.88 | 72.43 | 10.56 | 10.33 | 7.73 | 7.8 |
| 15 | t-Nonylamine | | 73.80 | 72.07 | 10.84 | 10.46 | 7.17 | 6.6 |
| 16 | t-Eicosylamine (avg.) | | | | | | 3.81 | 3.20 |
| 17 | Diethylaminoethylamine | 127–129 | | | | | 16.65 | 16.0 |
| 18 | 3-diethylamino-1-propylamine | 116–120 | | | | | 15.33 | 15.2 |
| 19 | 1-methyl-4-diethylaminobutylamine | 83–84 | 68.53 | 68.53 | 10.54 | 10.52 | 13.32 | 13.7 |
| 20 | 1,1-dimethyl-2-hydroxyethylamine | 236–237 | 59.56 | 59.48 | 7.85 | 7.93 | 9.93 | 9.90 |
| 21 | 1,1-di(hydroxymethyl)ethylamine | 236–237 | 53.49 | 53.54 | 7.05 | 7.30 | 8.91 | 9.14 |

TABLE V

| Ex. No. | Product | Crude Melting Point, ° C. | Percent Carbon | | Percent Hydrogen | | Percent Nitrogen | |
|---|---|---|---|---|---|---|---|---|
| | | | Calc'd. | Found | Calc'd. | Found | Calc'd. | Found |
| 22 | 2-t-butylamino-1,4-naphthoquinone | 86–87 | 73.34 | 73.05 | 6.59 | 6.62 | 6.11 | 6.2 |
| 23 | 2-(1,1,3,3-tetramethyl)butylamino-1,4-naphthoquinone | 132–134 | 75.76 | 76.00 | 8.12 | 8.09 | 4.91 | 4.7 |
| 24 | 2-(3-diethylamino)propylamino-1,4-naphthoquinone | 48–51 | 71.31 | 70.55 | 7.74 | 7.91 | 9.78 | 9.77 |
| 25 | 2-(1,1-dimethyl-2-hydroxyethylamino)-1,4-naphthoquinone | 108–109 | 68.56 | 66.21 | 6.16 | 6.25 | 5.71 | 6.04 |
| 26 | 2-dibutylamino-p-benzoquinone | 113–114 | | | | | 5.92 | 5.69 |
| 27 | 2-(2-diethylamino)ethylamino-p-benzoquinone | 118–119 | | | | | 12.6 | 12.3 |

These products were tested in the catalytic oxidation test described previously. The same base fluid was used as before. The results are tabulated in Table VI.

TABLE VI

| Additive as Prod. of Ex. No. | Conc., Weight Percent | NN Increase | Percent Increase of KV at 100° F. | Sludge | Lead Loss, mg. |
|---|---|---|---|---|---|
| None | | 5 to 9 | 390 | Trace | 19.2 |
| 22 | 0.5 | 4.11 | 96 | Nil | 1.4 |
| 23 | 1 | 3.93 | 110 | Nil | 4.8 |
| 24 | 2 | 6.20 | 104 | Heavy | 0 |
| 25 | 1 | 0.25 | 4 | Nil | 7.0 |
| 26 | 2 | 7.73 | 74 | Heavy | 0.7 |
| 26 | 1 | 7.86 | 168 | do | 0.3 |

The test was repeated at 450° F. (25° F. higher) with the following results:

| Additive as Prod. of Ex. No. | Conc., Weight Percent | NN Increase | Percent Increase of KV at 100° F. | Sludge | Lead Loss, mg. |
|---|---|---|---|---|---|
| None | | 8.3 | 585 | | 13.7 |
| 22 | 2 | 3.86 | 174 | Nil | 3.0 |
| 24 | 0.5 | 9.38 | 210 | Trace | 1.0 |

Halogen and alkyl derivatives of the aminoquinones of this invention may be prepared by following the procedures of the previous examples.

EXAMPLE 28

(a) In a suitable reactor is added 60 grams (0.82 mole) of t-butylamine to a solution of 24.6 grams (0.1 mole) of chloranil in 100 ml. of ethanol. The reaction proceeded exothermically. The desired product, 2,5-bis-t-butylamino-dichloro-p-benzoquinone, was extracted with benzene and crystallized therefrom. The product was a red crystal; M.P. 163–166° C.

Analysis.—Calc'd for $C_{14}H_{20}O_2N_2Cl_2$: C, 52.68%; H, 6.31%; N, 8.78%; Cl, 22.21%. Found: C, 52.57%; H, 6.48%; N, 9.06%; Cl, 21.65%.

(b) Further crystallization yielded purple crystals of crude, 2,5-bis-t-butylamino-3-chloro-p-benzoquinone; M.P. 110°–112° C.

Analysis.—Calc'd for $C_{14}H_{21}O_2N_2Cl$: C, 59.05%; H, 7.44%; N, 9.84%; Cl, 12.45%. Found: C, 56.16%; H, 7.63%; N, 8.89%; Cl. 13.86%.

EXAMPLE 29

(a) Using the method of Example 1, oxygen gas was passed slowly into a stirred solution of 5 grams (0.03 mole) of 2-t-butylhydroquinone in 50 ml. of ethanol and 20 ml. of t-butylamine. After 6 hours of stirring the mixture, 2 - t - butyl-5-t-butylamino-p-benzoquinone was obtained upon crystallization from benzene as red crystals; M.P. 97°–98° C.

Analysis.—Calc'd for $C_{14}H_{21}O_2N$: C, 71.46%; H, 8.99%; N, 5.95%. Found: C, 68.06%; H, 8.75%; N, 5.80%.

(b) This reaction was repeated using instead 10 grams (0.06 mole) of t-butylhydroquinone, 25 ml. of ethanol, and 10 grams (0.14 mole) of n-butylamine. The reaction was held for 4 hours. From the mixture was separated 2-t-butyl-5-n-butylamino - p - benzoquinone and 2-t-butyl-3,5-di-n-butylamino-p-benzoquinone.

(c) A third reaction, using 10 grams (0.06 mole) of t-butylhydroquinone, 30 ml. of ethanol, and 13 grams (0.12 mole) of benzylamine was conducted. Following the procedure of (a) above, the resulting mixture contained 2-t-butyl-5-benzylamino - p - benzoquinone and 2-t-butyl-3,5-dibenzylamino-p-benzoquinone.

EXAMPLE 30

(a) Following the procedure of Example 1, oxygen is passed slowly into a solution of 10 grams (0.06 mole) of t-butylhydroquinone and 6.2 grams (0.62 mole) of n-hexylamine in 25 ml. of ethanol for 6 hours at room temperature. The gray-green crystals of 2-t-butyl-3,5-di-n-hexylamino-p-benzoquinone (M.P. 174° C.) separated out.

(b) The filtrate from (a) was evaporated off leaving 2-t-butyl-5-n-hexylamino-p-benzoquinone. These are reddish-purple crystals, crystallized from benzene; M.P. 56°–58° C.

Analysis.—Calc'd for $C_{16}H_{25}O_2N$: C, 72.97%; H, 9.58%; N, 5.32%. Found: C, 71.29%; H, 9.35%; N, 5.22%.

EXAMPLE 31

(a) Into a suitable reactor was added 8 grams of 2,5-bis-(1,1-dimethyl - 2 - hydroxyethylamino)-p-benzoquinone (produced in accordance with the procedure of Example 2), 20 ml. of acetic acid and 12 grams of acetic anhydride were heated together at 130° C. for 3½ hours. After distilling off acetic acid and unreacted acetic anhydride, red crystals of 2,5-bis-(1,1-dimethyl-2-acetoxyethylamino)-p-benzoquinone are obtained from ethanol crystallization; M.P. 163°–165° C.

Analysis.—Calc'd for $C_{18}H_{26}O_6N_2$: C, 59.00%; H, 7.15%; N, 7.65%. Found: C, 58.58%; H, 7.13%; N, 7.49%.

(b) The caproyl derivative of (a) was produced by reacting 5 grams of the above aminoquinone with 4.9 grams of caproyl chloride in 25 ml. of dimethylforamide. The mixture is stirred for 2 hours and poured over crushed ice. The mixture is extracted with ether; removal of solvent yields crude 2,5-bis-(1,1-dimethyl - 2 - caproyloxyethylamino)-p-benzoquinone, a viscous red liquor.

Analysis.—Calc'd for $C_{26}H_{42}O_6N_2$: C, 65.25%; H, 8.84%; N, 5.85%. Found: C, 63.58%; H, 8.87%; N, 5.78%.

(c) The 2,5-bis-(2-acetoxyethylamino) - p - benzoquinone was prepared by substantially the same method of Example 31(a) from the 2-hydroxy-ethylamino intermediate.

EXAMPLE 32

(a) A mixture of 7.6 grams of 2,5-bis(1,1-dihydroxymethylethylamino)-p-benzoquinone, 30 ml. of acetic acid, and 20 grams of acetic anhydride is stirred at 125° to 130° C. for 3 hours. The acetic acid and unreacted acetic anhydride are removed by distillation under reduced pressure. Orange crystals of 2,5-bis-(1,1-diacetoxymethylethylamino)-p-benzoquinone are obtained by crystallization from methanol; M.P. 135°–136° C.

Analysis.—Calc'd for $C_{22}H_{30}O_{10}N_2$: C, 54.77%, H, 6.27%; N, 5.81%. Found: C, 54.54%; H, 6.37%; N, 5.86%.

(b) The caproxyloxy derivative of (a) was obtained by reacting 8 grams of the amine with 13.8 grams of caproyl chloride in 25 ml. of dimethylformamide. The mixture is stirred for 1.5 hours and is poured over crushed ice. Ether is used to extract the product, which is freed of solvent by distillation. The resulting brown oil is 2,5-bis-(1,1-dicaproyloxymethylethylamino)-p-benzoquinone.

Analysis.—Calc'd for $C_{38}H_{62}O_{10}N_2$: C, 64.56%; H, 8.84%; N, 3.96%. Found: C, 62.60%; H, 8.23%; N, 4.99%.

The products of Examples 28 to 32 were tested in the oxidation test described earlier, wherein the lubricant sample, using the same ester as the base fluid, is treated with air at 425° F. for 24 hours. The results of the test are tabulated in Table VII below:

TABLE VII

| Additive Prepared in Example | Conc., Weight percent | NN Increase | Percent Increase of KV at 100° F. | Sludge | Lead Loss, mg. |
|---|---|---|---|---|---|
| 28(a) | 0.75 | 2.38 | 51 | Nil | 2.0 |
| 28(b) | 0.75 | 2.38 | 50 | Nil | 2.0 |
| 29(a) | 0.6 | 3.72 | 59 | Heavy | 20.7 |
| 30(a) | <1 | 7.3 | 174 | Trace | 1.4 |
| 30(b) | 1.3 | 3.36 | 35 | Light | 2.1 |
| 31(a) | <1 | 0.43 | 25 | Nil | 2.0 |
| 31(b) | 1 | 3.95 | 38 | Light | 8.0 |
| 31(c) | <0.75 | 4.60 | 200 | Nil | 14.0 |
| 32(a) | <2 | 1.25 | 12 | Trace | 0 |
| 32(b) | 0.35 | 1.04 | 44 | Nil | 8.0 |

The product of Example 30(b) was tested for oxidation inhibition in a solvent-refined mineral oil sample in the presence of the same metals as in the above described test. The test was conducted for 40 hours, at 325° F., in an air stream of 10 liters per hour. The oil was tested alone and in the presence of a boronated alkenyl-succinimide ashless detergent, and in combinations of the aminoquinione and detergent. The results are tabulated in Table VIII.

TABLE VIII

| Additive | Conc., Weight percent | NN. Increase | Percent Increase of KV at 210° F. | Sludge | Lead Loss, mg. |
|---|---|---|---|---|---|
| None | | 20.75 | 271 | Medium | 80 |
| Detergent | 3.0 | 19.04 | 367 | Trace | 262 |
| Ex. 30(b) | 1.0 | 0.58 | 11 | Light | 6 |
| Detergent | 3.0 } | 0 | 8 | Nil | 4 |
| Ex. 30(b) | 1.0 } | | | | |

From the above tabulated data, it may be seen that the aminoquinones of this invention are effective antioxidants under extremely adverse conditions. Moreover they possess unexpected stability at high temperatures. Many of these aminoquinones, particularly the tertiary-alkylaminoquinones, the acyloxy derivatives, and the halogen and alkyl derivatives, are novel compounds. They possess sufficient solubility in lubricating fluids to provide the required antioxidant stability. The compositions of ths invention may be employed with additional additives present, namely detergents, dispersants, load carrying agents, anti-wear agents, viscosity index improvers, and the like.

Although this invention has been described with the aid of specific illustrations and working examples, the scope of this invention is not limited thereto except as indicated in the following claims.

We claim:
1. An organic composition consisting essentially of a major amount of an organic base medium selected from the group consisting of lubricants that are normally susceptible to oxidation deterioration and a minor amount sufficient to reduce the said oxidative deterioration of a quinone compound having the formula

$$R''\text{[Q]}\text{—[NRR']}_n$$

wherein Q is selected from the group consisting of benzoquinone, naphthoquinone and R'' substituted derivatives thereof; R and R' are individually selected from the group consisting of (1) hydrogen, (2) hydrocarbyl, (3) hydrocarbyl substituted by alkylamino, halo, hydroxy, alkoxy or acyloxy, at least one of R and R' being one of the aforesaid organic groups, and (4) members of one heterocyclic group attached to N; R'' is selected from the group consisting of the same groups as R and R' and additionally hydroxy and may occupy up to all of the available positions on the nucleus; said R, R' and R'', when an organic radical, having from 1 to about 40 carbon atoms; and $n$ is an integer ranging from 1 to 2.

2. The composition of claim 1 wherein the quinone compound has the structure selected from the group consisting of

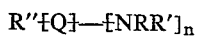

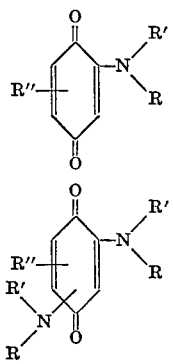

and

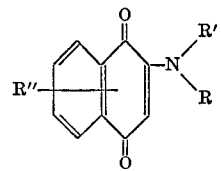

wherein each R, R' and R'' is selected from the group consisting of hydrogen, alkyl, alkenyl, cycloalkyl, aralkyl, aryl, alkaryl, hydroxyalkyl, alkoxyalkyl, acyloxyalkyl, aminoalkyl and alkylaminoalkyl, at least one of R and R' being one of the aforesaid organic groups and R'' is additionally hydroxy, and wherein R'' may occupy up to all the available positions on the nucleus.

3. The composition of claim 1 wherein R and R' are members of a single heterocyclic group which includes the said nitrogen atom.

4. The composition of claim 2 wherein R, R' and R'' have from 4 to 20 carbon atoms.

5. The composition of claim 2 wherein the quinone compound is the monoaminoquinone.

6. The composition of claim 5 wherein the quinone is a benzoquinone in which R in the 5-position is selected from the group consisting of n-butyl, t-butyl and benzyl, R' is hydrogen and R'' in the 2-position is t-butyl.

7. The composition of claim 5 wherein the quinone is benzoquinone in which R'' is hydrogen and the amino radical is selected from the group consisting of dibutylamino and 2-diethylaminoethylamino.

8. The composition of claim 5 wherein the quinone compound has the structure $$R''\!\!-\!\!\underset{\text{(quinone ring)}}{\bigcirc}\!\!-\!\!NH\!\!-\!\!\underset{\underset{CH_3}{|}}{\overset{\overset{CH_3}{|}}{C}}\!\!-\!\!CH_2\!\!-\!\!R'''$$

wherein R'' is selected from the group consisting of hydrogen, alkyl, hydroxy and acyloxy.

9. The composition of claim 8 wherein amino radical is selected from the group consisting of 1,1,3,3,-tetramethylbutyl and 1,1-dimethyl-2-hydroxyethyl and R'' is hydrogen.

10. The composition of claim 2 wherein the quinone compound is the bisamino-p-benzoquinone.

11. The composition of claim 10 wherein R is selected from the group consisting of alkyl having 2 to 20 carbon atoms and cyclohexyl, and R' and R'' are each hydrogen.

12. The composition of claim 10 wherein R'' is an alkyl group and the amino groups are in the 3,5-positions on the nucleus.

13. The composition of claim 10 wherein the quinone compound is selected from the group consisting of 2,5-bis-piperidinyl - p - benzoquinone, 2,5-bis-allylamino-p-benzoquinone, 2 - butyl - 3,5-di-n-hexylamino-p-benzoquinone, and 2-t-butyl-3,5-dibenzylamino-p-benzoquinone.

14. The composition of claim 10 wherein each of R and R', in the 2- and 5-positions, is selected from the group consisting of hydrogen, aminoalkyl, alkylaminoalkyl, acyloxyalkyl and hydroxyalkyl, at least one of R and R' being one of the aforesaid organic groups, and R'' is hydrogen.

15. The composition of claim 14 wherein R is selected from the group consisting of aminoethyl, diethylaminoethyl, 3-diethylaminopropyl, and 1-methyl-4-diethylaminobutyl and R' and R'' are hydrogen.

16. The composition of claim 14 wherein R is selected from the group consisting of hydroxyethyl, dihydroxymethyl-methyl, 2-acetoxyethyl, and 1,1-dicaproyloxymethylethyl, and R' and R'' are hydrogen.

17. The composition of claim 10 wherein the quinone compound has the structure

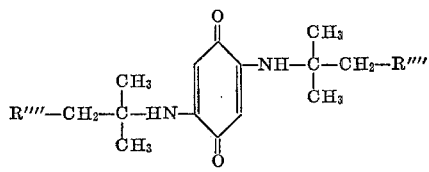

wherein R'''' is selected from the group consisting of hydrogen, hydroxy, alkyl and acyloxy.

18. The composition of claim 17 wherein the amino radical is selected from the group consisting of 1,1-dimethyl-2-acetoxyethyl, 1,1-dimethyl-2 - caproyloxyethyl, and 1,1-dimethyl-2-hydroxyethyl.

19. The composition of claim 14 wherein the amine group is an acyloxyalkylamino.

20. The composition of claim 1 wherein the base medium is a lubricating oil.

21. The composition of claim 20 wherein the lubricating oil is a synthetic fluid.

22. The composition of claim 21 wherein the synthetic fluid is an ester of pentaerythritol and a monocarboxylic acid of from 1 to about 30 carbon atoms.

References Cited

UNITED STATES PATENTS

| | | | |
|---|---|---|---|
| 2,339,796 | 1/1944 | Musher | 252—51 |
| 2,267,741 | 12/1941 | Langbein | 260—315 |
| 3,036,071 | 3/1962 | Frey | 260—246 |
| 2,134,505 | 10/1938 | Brunner | 260—246 |
| 3,037,015 | 3/1962 | Rudy | 260—211 |
| 3,189,548 | 6/1965 | Wilson | 252—51.5 |

DANIEL E. WYMAN, *Primary Examiner.*

W. J. SHINE, *Assistant Examiner.*

U.S. Cl. X.R.

260—45.9, 45.85

UNITED STATES PATENT OFFICE

CERTIFICATE OF CORRECTION

Patent No. 3,445,391          Dated May 20, 1969

Inventor(s) MILTON BRAID and DEREK A. LAW

It is certified that error appears in the above-identified patent and that said Letters Patent are hereby corrected as shown below:

Column 2, line 56, " R and R" " should read -- R and R' --. Column 3, line 24, " 1,1-dihydroxy-methylethylamine" should read -- 1,1-dihydroxymethylethylamine ---. Column 3, lines 59 and 61, both occurrences, " (...ethylamino)-6 " should read -- (...ethylamino)-p --. In Table VI, under the heading " Conc. Weight Percent ", " 1 " (second occurrence reading down the column) should read -- less than 1 --. In Table VIII, under the heading " Additive ", " Detergent... " (second occurrence) should read -- Detergent + --. In claim 8, " R" " in the line following the formula should read -- R"' --. In claim 19, " amine" should read -- amino ---.

SIGNED AND
SEALED
MAR 17 1970

(SEAL)
Attest:

Edward M. Fletcher, Jr.
Attesting Officer

WILLIAM E. SCHUYLER, JR.
Commissioner of Patents